US012643119B2

(12) United States Patent
Yao et al.

(10) Patent No.: US 12,643,119 B2
(45) Date of Patent: Jun. 2, 2026

(54) EDGE COATING APPARATUS AND COATING METHOD FOR PHOTOVOLTAIC CELL SHEETS

(71) Applicant: SUZHOU SUNWELL NEW ENERGY CO., LTD., Suzhou (CN)

(72) Inventors: Yu Yao, Suzhou (CN); Zhongtian Li, Suzhou (CN)

(73) Assignee: Suzhou Sunwell New Energy Co., Ltd., Suzhou (CN)

( * ) Notice: Subject to any disclaimer, the term of this patent is extended or adjusted under 35 U.S.C. 154(b) by 210 days.

(21) Appl. No.: 18/725,080

(22) PCT Filed: Dec. 26, 2022

(86) PCT No.: PCT/CN2022/141872
§ 371 (c)(1),
(2) Date: Jun. 27, 2024

(87) PCT Pub. No.: WO2023/125394
PCT Pub. Date: Jul. 6, 2023

(65) Prior Publication Data
US 2025/0153210 A1 May 15, 2025

(30) Foreign Application Priority Data
Dec. 31, 2021 (CN) ......................... 202111676951.7

(51) Int. Cl.
*B05C 5/02* (2006.01)
*B05D 1/26* (2006.01)

(52) U.S. Cl.
CPC .............. *B05C 5/0204* (2013.01); *B05D 1/26* (2013.01)

(58) Field of Classification Search
CPC ......... B05C 5/0204; B05C 9/04; B05C 13/02; B05D 1/26; H10F 19/80; H10F 71/00; Y02E 10/50
See application file for complete search history.

(56) References Cited

FOREIGN PATENT DOCUMENTS

| | | | |
|---|---|---|---|
| CN | 201940332 | | 8/2011 |
| CN | 210187787 U | * | 3/2020 |
| CN | 114122160 | | 3/2022 |
| CN | 216928600 | | 7/2022 |
| JP | H01176469 | | 7/1989 |
| JP | H01176469 A | * | 7/1989 |

(Continued)

OTHER PUBLICATIONS

International Search Report and Written Opinion for International PCT Application No. PCT/CN2022/141872 dated Feb. 17, 2023 in 10 pages [ISR Translated].

*Primary Examiner* — William P Fletcher, III
(74) *Attorney, Agent, or Firm* — Knobbe, Martens, Olson & Bear, LLP

(57) ABSTRACT

Disclosed are an edge coating apparatus and method for a photovoltaic cell precursor. The edge coating apparatus includes a coating device. The coating device includes a coating wheel capable of rotation, and a feeding mechanism for supplying a coating material to the coating wheel. The coating wheel has an accommodating cavity for accommodating the coating material and a plurality of discharging channels communicating the accommodating cavity and an outer circumference surface of the coating wheel, and the plurality of discharging channels are circumferentially spaced apart.

16 Claims, 7 Drawing Sheets

(56) References Cited

FOREIGN PATENT DOCUMENTS

| | | | | | |
|---|---|---|---|---|---|
| JP | H07263474 | | | 10/1995 | |
| JP | H07263474 | A | * | 10/1995 | |
| WO | WO 2010/011200 | | | 1/2010 | |
| WO | WO-2010011200 | A1 | * | 1/2010 | ............ H10F 77/30 |

* cited by examiner

EDGE COATING APPARATUS AND COATING METHOD FOR PHOTOVOLTAIC CELL SHEETS

RELATED APPLICATION

The present application claims priority to Chinese Patent Application No. CN2021116769517, filed on Dec. 31, 2021, the entire content of which is incorporated herein by reference.

FILED OF TECHNOLOGY

The present disclosure relates to the field of photovoltaic cell manufacturing, in particular to an edge coating apparatus and method for a photovoltaic cell precursor.

BACKGROUND

A crystalline silicon solar cell usually employs a metal electrode that formed by screen printing silver paste, and then high-temperature or low-temperature sintering, to lead out photon-generated carriers, which is also a most widely used metallization method for a crystalline silicon solar cell at present, and the metallization process is simple and also a mainstream mass production process at present. In recent years, as silicon precursor and cell processes are continuously developed, a production cost of the solar cell is continuously reduced, wherein a proportion of a cost of the expensive silver paste of a metallization production process in a whole cell cost is continuously increased, and a width-to-height ratio of a silver electrode is limited by the screen printing process, thereby hindering a further improvement of a cell efficiency.

In order to further reduce the cost of the solar cell and improve the cell efficiency, a possibility of mass production of the metal electrode of the solar cell that using an electroplating method is researched, wherein the electroplating method can employs cheaper metal, such as nickel, copper, or the like, to partially or completely replaced silver so as to reduce the cost.

In the crystalline silicon solar cell, different elements are doped to form an N-type diffusion layer and a P-type diffusion layer to form a cell PN junction, which generates a voltage difference, and carriers are generated under sunlight, to realize external power supply of the cell. In order to improve reliability of the solar cell, an edge of a cell precursor is required to be protected by an insulating material in the process of forming the metal electrode by an electroplating process, so as to prevent the metal from being deposited on the peripheral edge of the cell wafer. The insulating material can be selected from photo-curable ink, thermal-curable ink and insulating glue with a similar performance. The insulating material can be applied by non-contact coating; for example, CN201940332U discloses a non-contact edge coating device for a solar cell precursor, in which a precursor support is connected with a handling device, such that the precursor is moved into a groove of a roller to be coated with a coating material. However, the edge coating apparatus cannot meet a takt time required for mass production of the solar cell, and when a size tolerance of the silicon precursor is unavoidable, it is difficult to control the precision of covering during edge coating.

SUMMARY

An object of the present disclosure is to provide an edge coating method for a photovoltaic cell precursor, so as to solve one or more problems in conventional art.

A first aspect of the disclosure provides an edge coating method for a photovoltaic cell precursor including:

step (1)—supporting a to-be-coated cell precursor horizontally on a precursor carrying platform, the cell precursor having a to-be-coated edge portion, and the edge portion being positioned on an outer side of the precursor carrying platform;

step (2)—adjusting relative positions of the edge portion and a coating device, such that a position of a discharging portion of the coating device is correspondingly fitted with a position of the to-be-coated edge portion; and step (3)—coating the edge portion with a coating material via the discharging portion by the coating device, so as to realize coating of the edge portion.

In some embodiments, the step (2) includes:

step (2-1)—adjusting a position of the precursor carrying platform, such that the cell precursor is moved with the wafer carrying platform to allow the edge portion thereof to extend along a preset first direction;

in the step (3), the precursor carrying platform and/or the coating device move(s) horizontally along the first direction.

In some embodiments, in the step (2-1), the precursor carrying platform is driven to rotate around a rotation center line extending in a vertical direction, to make the edge portion extend in the first direction.

In some embodiments, the step (2) further includes:

step (2-2)—adjusting a relative position of the coating device and the precursor carrying platform in a preset second direction, the second direction being perpendicular to the first direction.

In some embodiments, during relative movement of the precursor carrying platform and the coating device along the first direction, a distance between the discharging portion of the coating device and the edge portion is kept at a constant preset value or within a preset range.

In some embodiments, a first chamfered portion and a second chamfered portion are formed at a front end and a rear end of the edge portion respectively, and the step (3) includes:

step (3-1)—during a process that the first chamfered portion passes through the coating device, rotating the precursor carrying platform around the rotation center line extending in the vertical direction, and coating the first chamfered portion by the coating device;

step (3-2)—relatively moving the precursor carrying platform and the coating device along the first direction, and coating the edge portion by the coating device; and step (3-3)—during a process that the second chamfered portion passes through the coating device, rotating the precursor carrying platform around the rotation center line extending in the vertical direction, and coating the second chamfered portion by the coating device.

In some embodiments, in the step (3), the coating device is fixed and the precursor carrying platform is moved in the first direction.

In some embodiments, the coating device includes at least a coating wheel, and in the step (3), the coating wheel rotates around the rotation center line extending in the vertical direction for discharging, so as to coat the edge portion with the coating material.

In some embodiments, in the step (3), a velocity of relative horizontal movement of the precursor carrying platform and the coating wheel in the first direction is consistent with or as close as possible to a linear velocity of the coating wheel. Preferably, a ratio of the velocity of the relative horizontal movement of the precursor carrying platform and the coating wheel in the first direction to the linear velocity of the coating wheel is 0.5-1.2, such that coating materials with different viscosities can be adjusted within a certain range to achieve a same coating effect.

In some embodiments, the cell precursor has two edge portions provided oppositely and having parallel length extending directions, and in the step (3), during a process of relatively moving of the precursor carrying platform and the coating device, the two edge portions are coated by two coating devices provided on two sides of the cell precursor respectively.

In some embodiments, in the step (2), positions of the two coating devices are adjusted according to positions of the edge portions on the corresponding sides respectively.

In some embodiments, the cell precursor has two first edge portions oppositely provided and parallel to each other, and two second edge portions oppositely provided and parallel to each other, an angle between the first edge portion and the second edge portion is $\alpha$, and the edge coating method includes the following step:

rotating the cell precursor by the angle $\alpha$ after the two first edge portions are coated by executing the steps (1) to (3), then repeating the steps (1) to (3) to coat the two second edge portions.

In some embodiments, the angle $\alpha$ between the first edge portion and the second edge portion is 90°.

In some embodiments, after coating of the first edge portions is completed, the cell precursor is transferred to another precursor carrying platform to realize coating of the second edge portions.

In some embodiments, the cell precursor has a plurality of edge portions, and after one of the edge portions is coated in the steps (2) and (3), the precursor carrying platform is rotated around the rotation center line extending in the vertical direction, and/or the coating device is moved, such that the position of the discharging portion of the coating device is correspondingly fitted with the position of another to-be-coated edge portion, and then the step (3) is repeated.

In some embodiments, the edge coating method further includes a curing step of transferring the cell precursor onto a carrying device after coating of all the edge portions of the cell precursor is completed, keeping all the edge portions in a suspended state, and curing the cell precursor.

In some embodiments, the coating material is liquid thermosetting resin or photo-curable acid-resistant resin soluble in an alkaline solution.

In some embodiments, a viscosity of the coating material is 50-1,200 cP, preferably 120-800 cP.

In some embodiments, the coating device includes a coating wheel, and the discharging portion is located at an outer circumference surface of the coating wheel; or, the coating device includes at least a coating spraying tube or a coating needle with a discharging opening, and the discharging opening forms the discharging portion.

Another aspect of the present disclosure provides an edge coating apparatus for a photovoltaic cell precursor, including a precursor carrying device and a coating device, wherein the precursor carrying device includes at least a precursor carrying platform for carrying the cell precursor, the coating device at least has a discharging portion, and the coating apparatus is configured to implement the edge coating method as described above.

Yet another aspect of the present disclosure provides an edge coating apparatus for a photovoltaic cell precursor including:

a precursor carrying device horizontally movable along a first direction and at least including a precursor carrying platform for carrying the cell precursor;

a coating device horizontally movable along a second direction, the first direction and the second direction being perpendicular to each other; and a driving device for driving the coating device to move along the second direction.

In some embodiments, the coating device includes a coating wheel capable of rotating around a rotation center line extending in a vertical direction for discharging, and a feeding mechanism for supplying a coating material to the coating wheel.

In some embodiments, the precursor carrying platform is a negative pressure sucking platform capable of sucking and fixing the cell precursor, the cell precursor has a to-be-coated edge portion, and when the cell precursor is placed on the precursor carrying platform, the edge portion is positioned on an outer side of the precursor carrying platform.

In some embodiments, an annular groove for accommodating the edge portion is provided in an outer circumference surface of the coating wheel, the coating wheel has an accommodating cavity for accommodating the coating material and discharging channels communicating the accommodating cavity and the annular groove, and the discharging channels are circumferentially spaced apart.

In some embodiments, the coating wheel includes an upper wheel body and a lower wheel body which are detachably connected, a plurality of upper slots circumferentially distributed at intervals are provided in an outer circumference surface of the upper wheel body, a plurality of lower slots circumferentially distributed at intervals are provided in an outer circumference surface of the lower wheel body, and the upper slots and the lower slots are fitted in a one-to-one correspondence manner and form the plurality of discharging channels.

In some embodiments, the precursor carrying platform is configured to rotate around the rotation center line extending in the vertical direction.

In some embodiments, the precursor carrying device further includes a platform adjusting mechanism for driving the precursor carrying platform to rotate around the rotation center line to adjust a position of the precursor carrying platform, the edge coating apparatus further includes a cell precursor positioning system for positioning an actual position of the cell precursor on the precursor carrying platform, and the cell precursor positioning system is in communication connection with the platform adjusting mechanism and the driving device.

In some embodiments, the coating device includes at least a coating spraying tube or a coating needle, the coating spraying tube or the coating needle has a discharging opening, and the discharging opening is oriented towards the precursor carrying platform.

In some embodiments, two coating devices are provided, and the two coating devices are arranged on two different sides of the precursor carrying platform in the first direction respectively.

In some embodiments, two or more precursor carrying devices are arranged at intervals along the first direction, and the edge coating apparatus further includes a handling device for transferring the cell precursor between different precursor carrying platforms.

In some embodiments, the edge coating apparatus further includes a holder for placing the coated cell precursor, an unloading device for transferring the cell precursor from the precursor carrying platform to the holder, and a curing system for curing the cell precursor, and the curing system is a hot air dryer or a photo-curing machine or a tunnel kiln.

Due to the application of the above technical solution, compared with the conventional art, the present disclosure has the following advantages:

- the edge coating apparatus and method for a photovoltaic cell precursor according to the present disclosure, horizontally supporting the cell precursor on the precursor carrying platform, and adjusting the to-be-coated edge portion of the cell precursor to be correspondingly fitted with the discharging portion of the coating device, and then, the coating device coating the edge portion with the coating material via the discharging portion, so as to realize the coating of the edge portion. Each moving component in the apparatus can only move according to a set movement path, which is convenient to be operated to control, there is no need to use a complicated multiaxis robot, the circumferential edge portion of the cell precursor is rapidly coated, and the apparatus occupies a small space, is particularly suitable for mass continuous circulation processing, and can greatly improve a coating efficiency and edge coating precision of the cell precursor.

Figure 1:
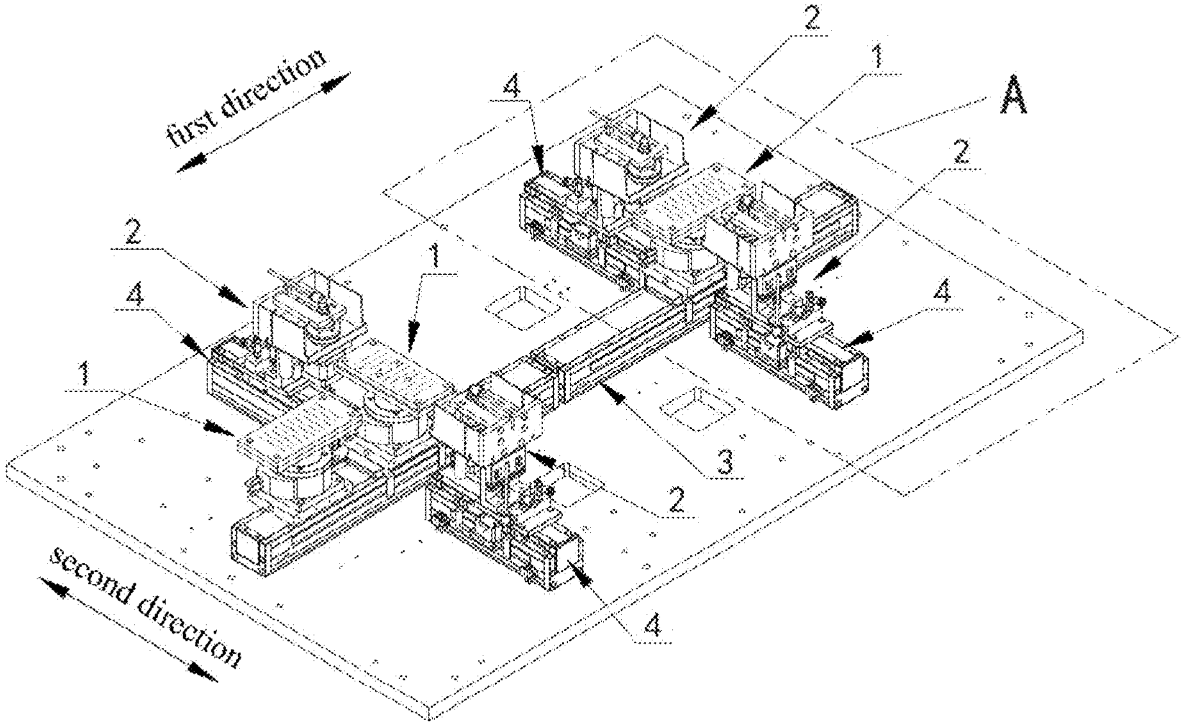
FIG. 1 is a schematic perspective structural diagram of an edge coating apparatus according to an embodiment of the present disclosure.
Figure 2:
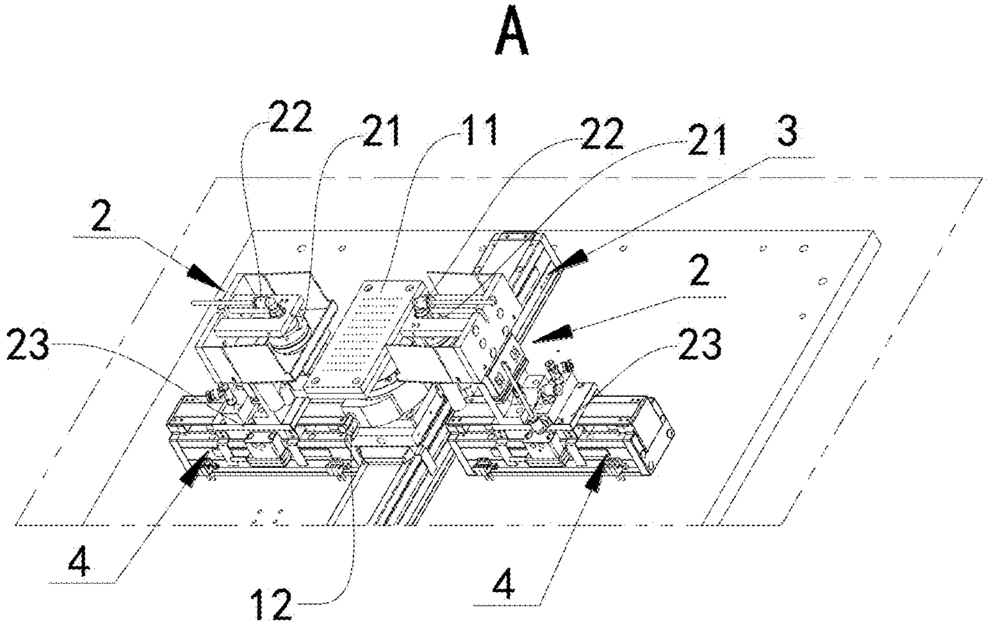
FIG. 2 is a schematic enlarged diagram of portion A in FIG. 1.
Figure 3:
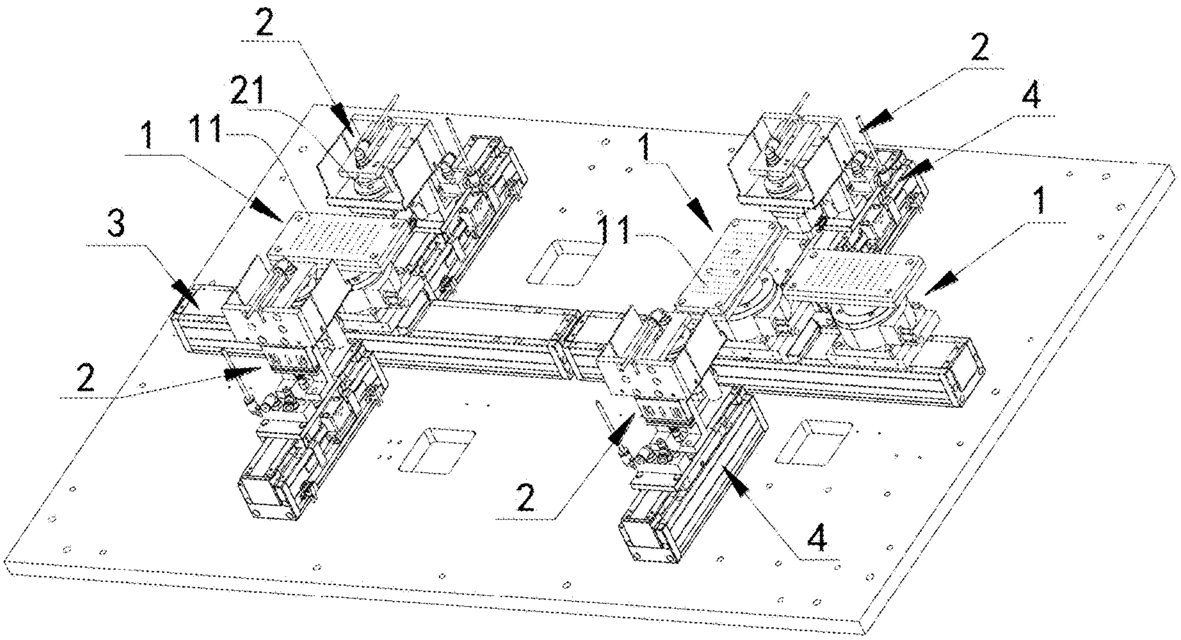
FIG. 3 is a schematic perspective structural diagram of the edge coating apparatus of FIG. 1 from another perspective.
Figure 4:
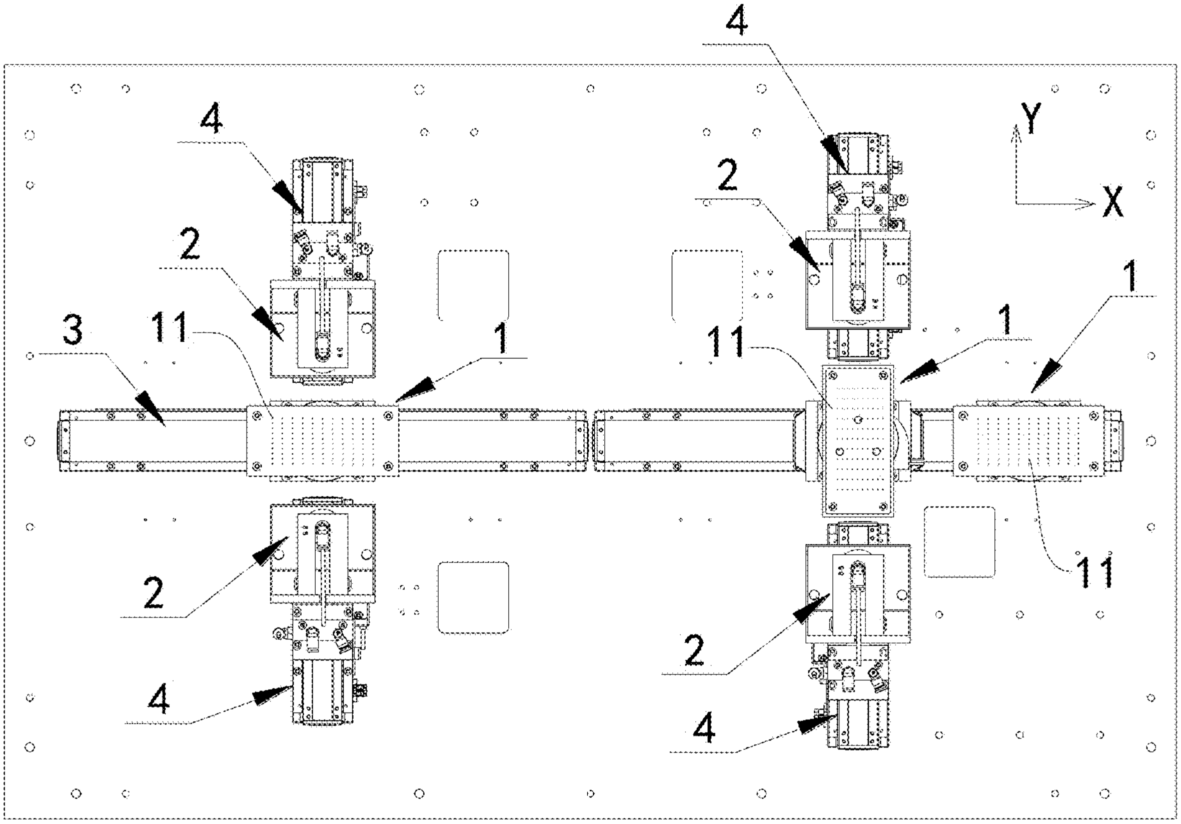
FIG. 4 is a schematic top structural diagram of the edge coating apparatus of FIG. 1.
Figure 5:
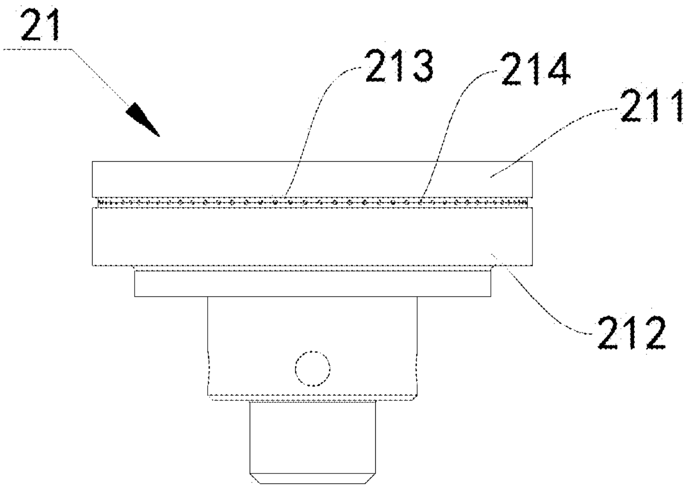
FIG. 5 is a schematic side structural diagram of a coating wheel of the edge coating apparatus of FIG. 1.
Figure 6:
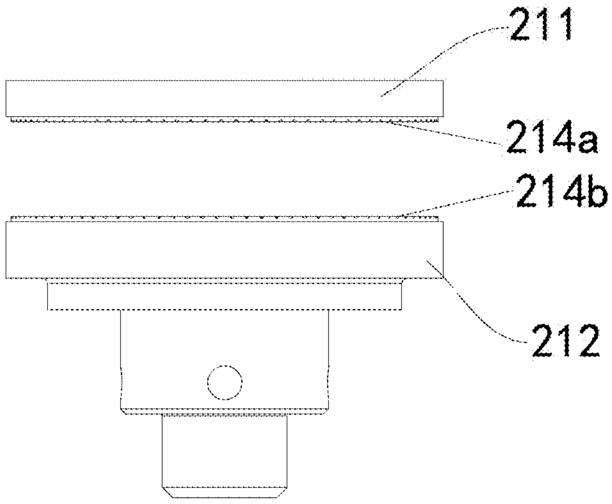
FIG. 6 is a schematic exploded structural diagram of the coating wheel of FIG. 5.
Figure 7:
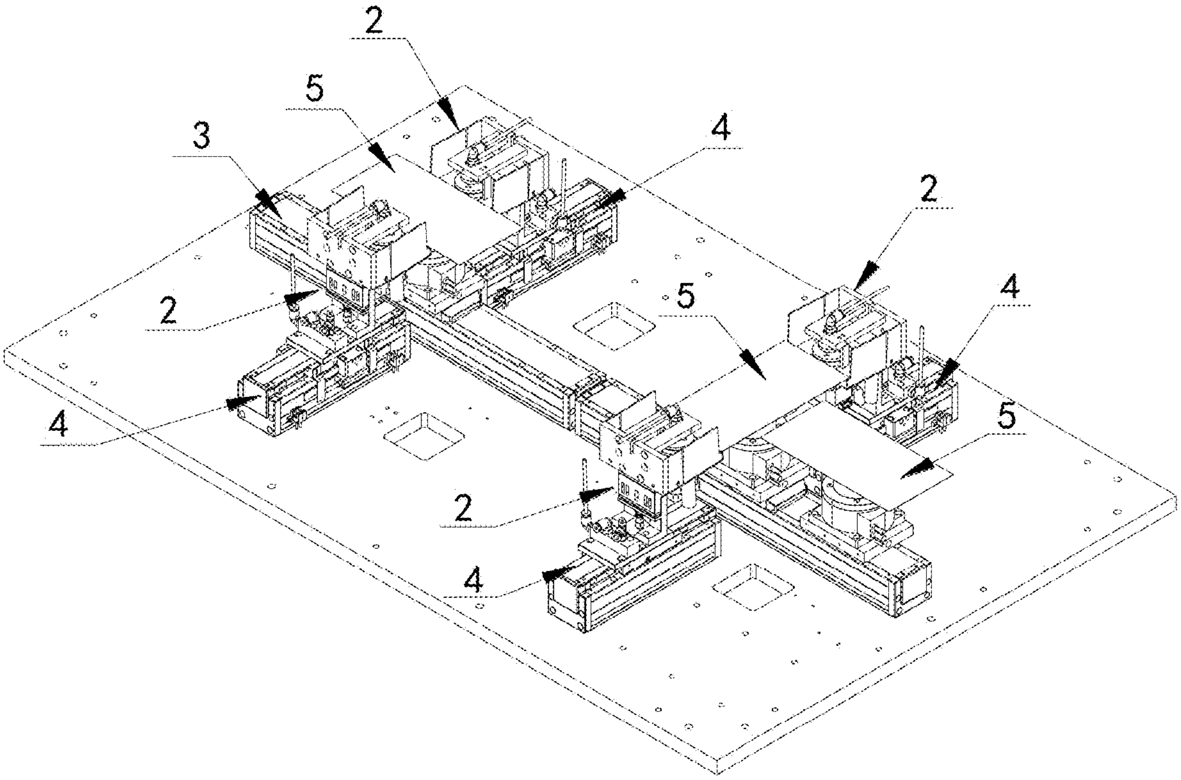
FIG. 7 is a schematic perspective structural diagram when the edge coating apparatus of FIG. 1 cooperating with a cell precursor to realize coating.
Figure 8:
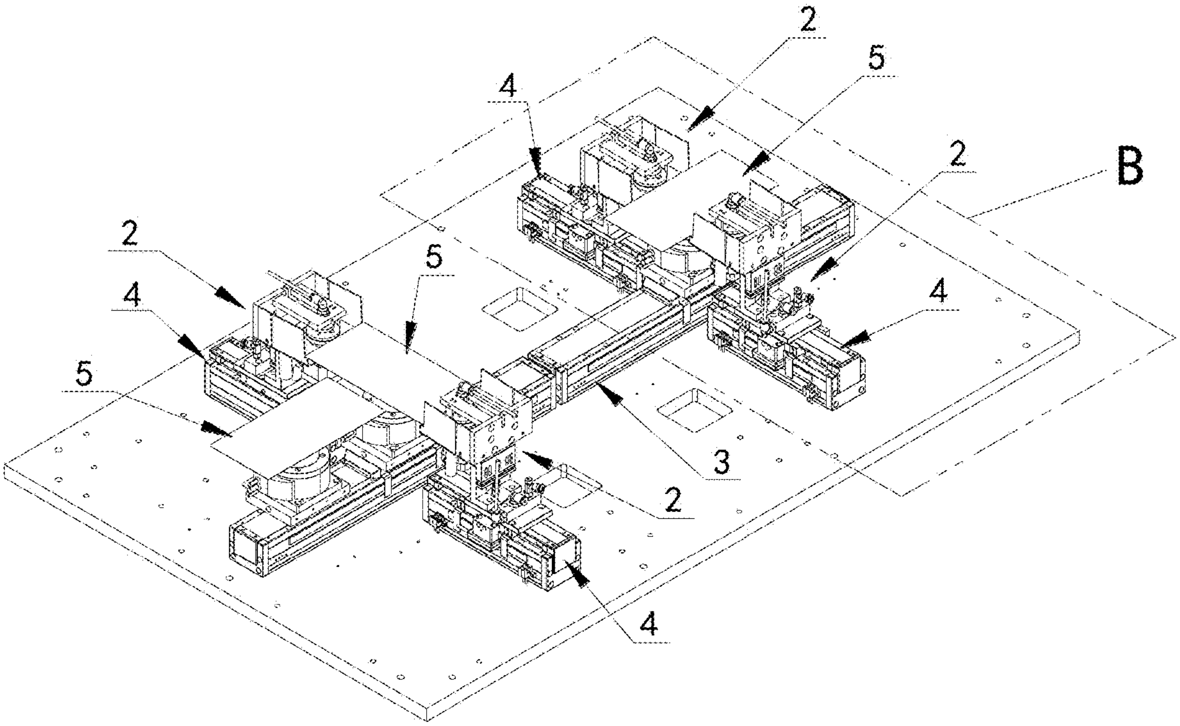
FIG. 8 is a schematic perspective structural diagram of the edge coating apparatus of FIG. 7 from another perspective.
Figure 9:
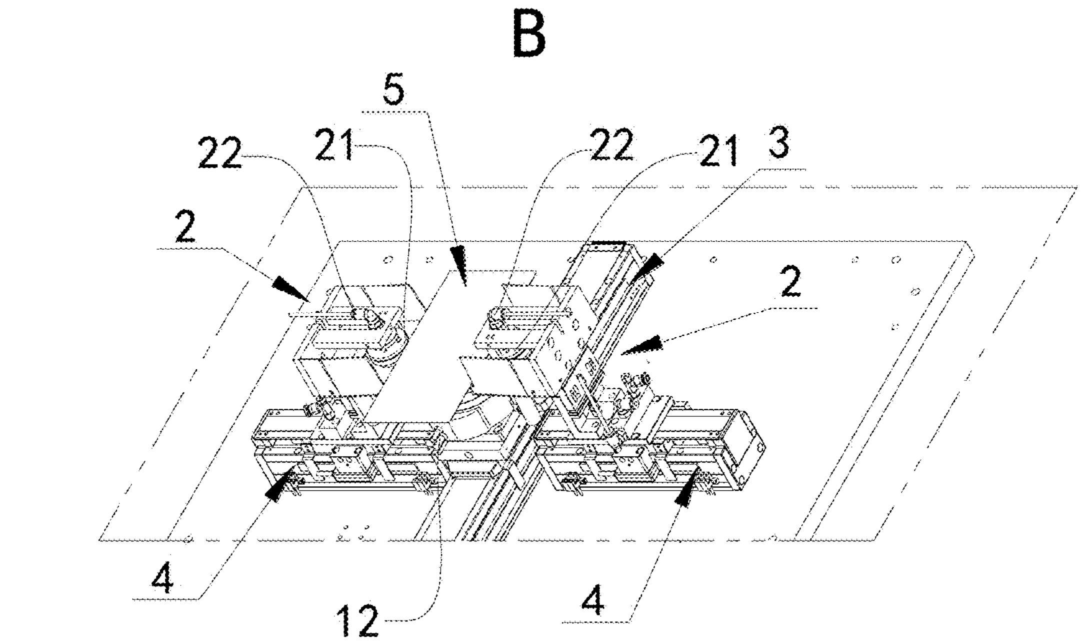
FIG. 9 is a schematic enlarged diagram of portion B in FIG. 8.
Figure 10:
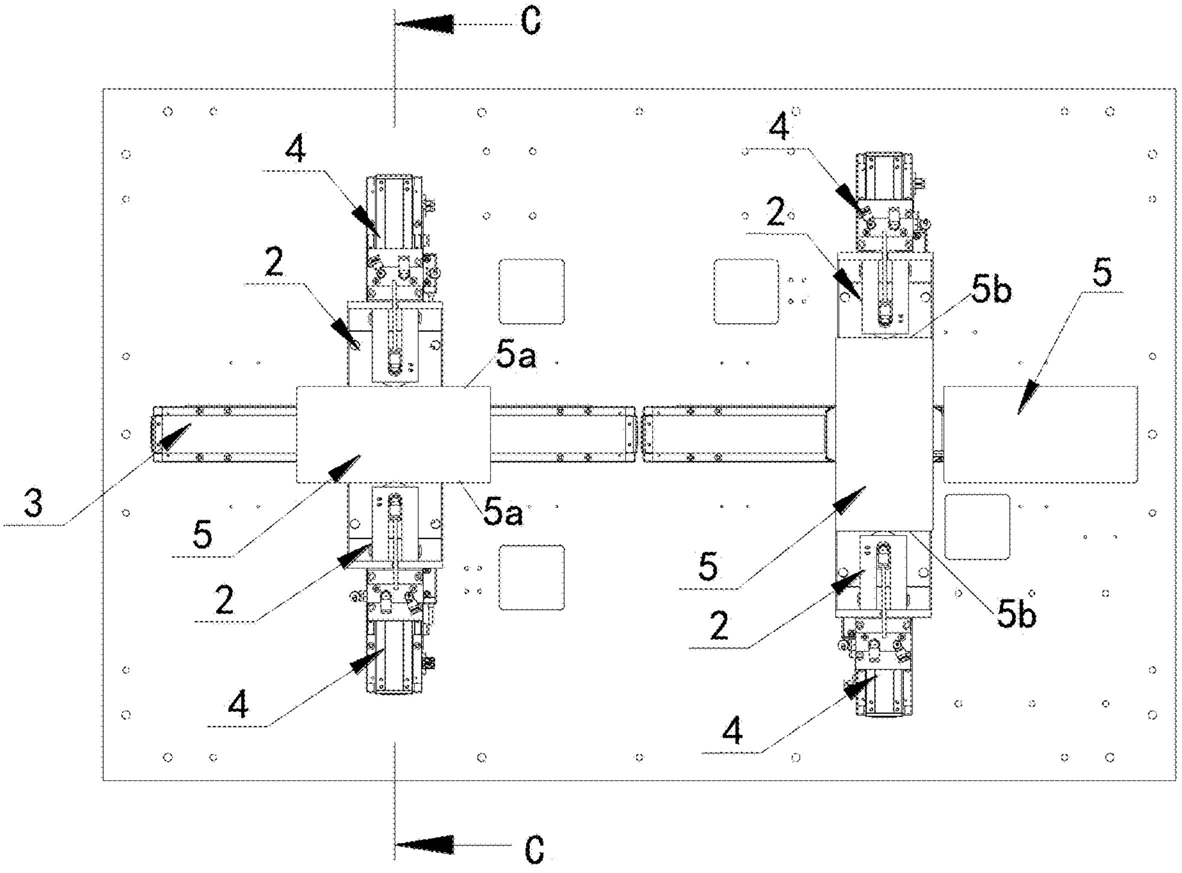
FIG. 10 is a schematic top structural diagram of the edge coating apparatus of FIG. 7.
Figure 11:
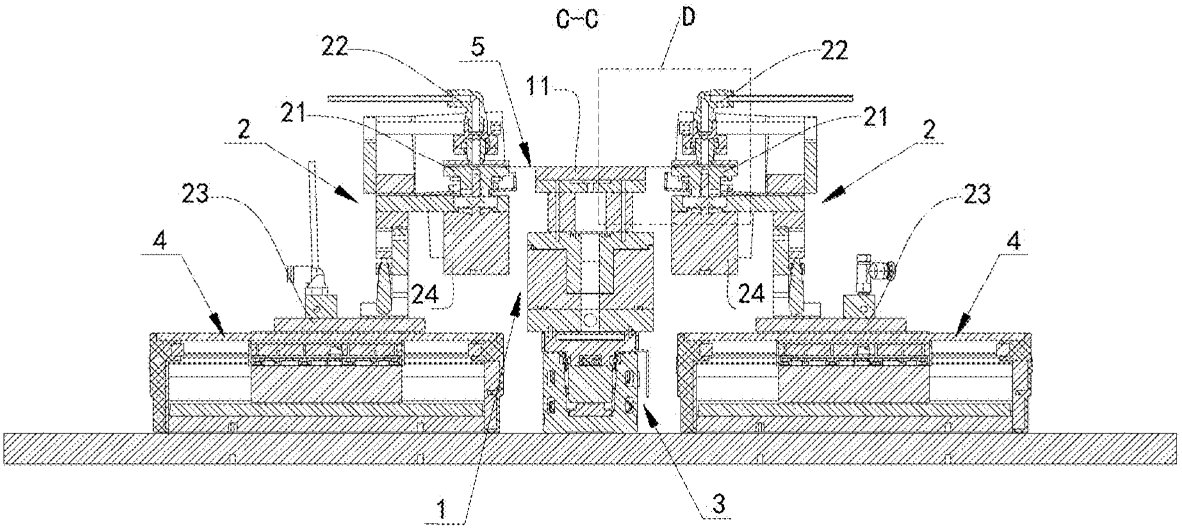
FIG. 11 is a schematic sectional structural diagram along C-C in FIG. 10.
Figure 12:
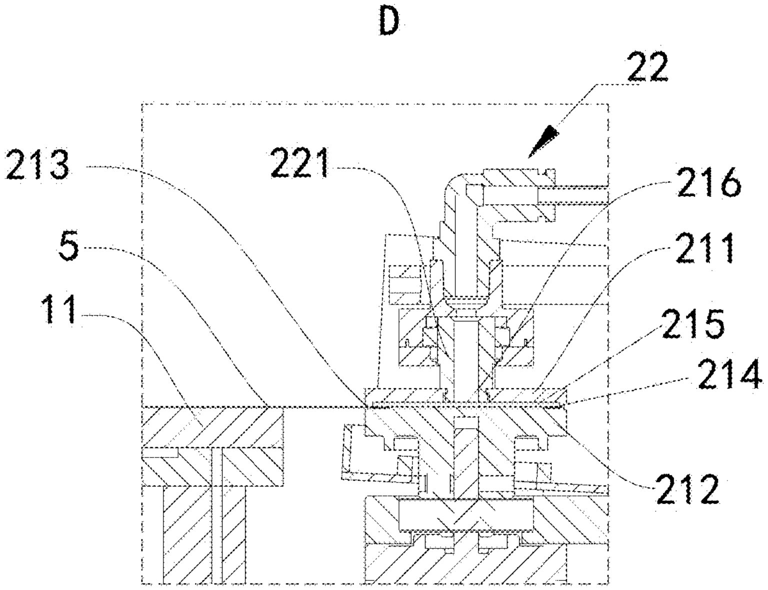
FIG. 12 is a schematic enlarged diagram of portion D in FIG. 11.

In the drawings: 1—precursor carrying device; 11—precursor carrying platform; 12—negative pressure introduction mechanism; 2—coating device; 21—coating wheel; 211—upper wheel body; 212—lower wheel body; 213—annular groove; 214—discharging channel; 214*a*—upper groove; 214*b*—lower groove; 215—accommodating cavity; 216—material injection hole;

22—feeding mechanism; 221—feeding pipe; 3—advancing device; 4—driving device; 5—cell precursor; 5*a*—first edge portion; 5*b*—second edge portion; 5*c*—first chamfered portion; 5*d*—second chamfered portion.

DETAILED DESCRIPTION

The technical solution of the present disclosure is further explained below in conjunction with the accompanying drawings and the preferred embodiments.

Referring to FIGS. 1 to 6, an edge coating apparatus for a photovoltaic cell precursor includes a precursor carrying device 1, a coating device 2, an advancing device 3 and a driving device 4, wherein, the precursor carrying device 1 is horizontally movable along a first direction. The precursor carrying device 1 at least includes a precursor carrying platform 11 for carrying a to-be-coated cell precursor 5, and the precursor carrying platform 11 is rotatable around a rotation center line extending along a vertical direction. The advancing device 3 can drive the precursor carrying device 1 to integrally advance along the first direction. The coating device 2 is horizontally movable in a second direction which is perpendicular to the first direction. For the first direction and the second direction, reference is made to schematic representation in FIG. 1.

In the present embodiment, the coating device 2 includes a coating wheel 21 rotatable around the rotation center line extending in the vertical direction for discharging, and a feeding mechanism 22 for supplying a coating material to the coating wheel 21. An outer circumference surface of the coating wheel 21 is provided with a discharging portion. The driving device 4 is configured to drive the coating device 2 to move in the second direction. In other embodiments, the coating device 2 may also include a coating spraying tube or a coating needle with a discharging opening.

The precursor carrying platform 11 is specifically a negative pressure sucking platform capable of sucking and fixing the cell precursor 5, and below which a negative pressure introduction mechanism 12 is provided, such that the cell precursor 5 is fixedly sucked after transferred onto the precursor carrying platform 11 and synchronously moves with the movement of the precursor carrying platform 11.

The precursor carrying device 1 further includes a platform adjusting mechanism (not shown in the accompanying drawings) for driving the precursor carrying platform 11 to rotate around the rotation center line to adjust a position of the precursor carrying platform 11, the platform adjusting mechanism may be specifically a motor provided below the precursor carrying platform 11, and the motor is configured to drive the precursor carrying platform 11 to rotate around the rotation center line by a specified angle, so as to adjust a position of the cell precursor 5 on the precursor carrying platform 11. When the cell precursor 5 is supported on the precursor carrying platform 11, a to-be-coated edge portion thereof is positioned on an outer side of the precursor carrying platform 11 to be fitted with the coating wheel 21 without contact, such that the coating wheel 21 coats the edge portion of the cell precursor 5 with the coating material during rotation, so as to realize the coating of the edge portion.

The edge coating apparatus further includes a cell precursor positioning system (not shown in the accompanying drawings) for positioning an actual position of the cell precursor 5 on the precursor carrying platform 11, the cell precursor positioning system at least includes a camera, the cell precursor positioning system is in communication connection with the platform adjusting mechanism and the driving device 4, and the platform adjusting mechanism drives the precursor carrying platform 11 to rotate by a required rotation angle according to the actual position of the cell precursor 5 positioned by the cell precursor positioning system, such that a length extending direction of the to-be-coated edge portion is parallel to the first direction. The driving device 4 is horizontally moved by a required distance along the second direction according to the actual position of the cell precursor 5, such that a position of the discharging portion of the coating wheel 21 is correspondingly fitted with a position of the to-be-coated edge portion, and a tangential direction of the discharging portion is parallel to the length extending direction of the to-be-coated edge portion. Thus, the cell precursor 5 is carried by the precursor carrying platform 11, and in the process that the whole precursor carrying device 1 is horizontally moved along the first direction, different positions of the to-be-coated edge portion of the cell precursor 5 sequentially pass through the discharging portion of the coating wheel 2, so as to realize the coating of the whole edge portion.

As shown in FIGS. 5, 6, 11 and 12, the outer circumference surface of the coating wheel 21 has an annular groove 213 for accommodating the edge portion of the cell precursor 5, the coating wheel 21 has an accommodating cavity 215 for accommodating the coating material, and discharging channels 214 communicating the accommodating cavity 215 and the annular groove 213, and the plural discharging channels 214 are circumferentially spaced apart around the rotation center line of the coating wheel 21. Here, discharging openings of all the discharging channels 214 are provided at regular intervals on a circumferential side surface of the annular groove 213, such that as uniform discharging as possible can be realized when the coating wheel 21 rotates. The discharging portion of the coating wheel 21 is formed by one or more discharging openings of the coating wheel 21 facing the to-be-coated edge portion of the cell precursor 5, and the discharging openings of all the discharging channels 214 alternately form the discharging portion partially or completely during the rotation of the coating wheel 21. During the rotation of the coating wheel 21, the coating material in the accommodating cavity 215 enters the annular groove 213 through the plurality of discharging channels 214 by a centrifugal force, and the edge portion of the cell precursor 5 passes through the annular groove 213 and receives the coating material in the annular groove 213 during the horizontal movement of the cell precursor 5 in the first direction, so as to realize coating.

Specifically, the coating wheel 21 includes an upper wheel body 211 and a lower wheel body 212 which are detachably connected, a plurality of upper slots 214*a* which are circumferentially distributed at intervals are provided in an outer circumference surface of the upper wheel body 211, a plurality of lower slots 214*b* which are circumferentially distributed at intervals are provided in an outer circumference surface of the lower wheel body 212, and when the upper wheel body 211 and the lower wheel body 212 are fixedly fitted with each other to form the coating wheel 21, the upper slots 214*a* and the lower slots 214*b* are correspondingly fitted with each other to form the plurality of discharging channels 214. Thus, not only the manufacture of the upper wheel body 211 and the lower wheel body 212 is simpler, but also an interior of the coating wheel 21 and the discharging channel 214 can be cleaned conveniently, and residues caused by the fact that the coating material is not easy to clean after dried are avoided. An extending direction of the discharging channel 214 is not limited herein, and the discharging channel may extend along a radial direction of the coating wheel 21 as shown in the present embodiment, and may also extend along a vortex curve in other embodiments, such that the coating material in the accommodating cavity 215 can flow outwards into the annular groove 213 under the action of the centrifugal force when the coating wheel 21 rotates.

An upper portion of the coating wheel 21, specifically the upper wheel body 211, is further provided with a material injection hole 216 through in an up-down direction, the feeding mechanism 22 at least has a feeding pipe 221, a lower portion of the feeding pipe 221 is inserted into the material injection hole 216 in a sealing fit manner and is rotatable relative to the upper wheel body 211, and in the process that the coating wheel 21 rotates around an axis thereof to coat the edge portion of the cell precursor 5, the feeding pipe 221 is kept stationary and continuously supplies the coating material into the accommodating cavity 215 of the coating wheel 21. Furthermore, when the coating wheel 21 is required to be cleaned, a cleaning material can be injected into the accommodating cavity 215 of the coating wheel 21 by the feeding mechanism 22, so as to automatically clean the accommodating cavity 215, the discharging channel 214 and the annular groove 213 of the coating wheel 21, and the cleaning is also quite convenient.

The coating material is specifically liquid thermosetting resin or photo-curable acid-resistant resin soluble in an alkaline solution, and has a viscosity of 50-1,200 cP, preferably 120-800 cP.

In the present embodiment, two coating devices 2 are provided, and the two coating devices 2 are arranged on two different sides of the precursor carrying platform 11 in the first direction respectively, such that two opposite and parallel edge portions of the cell precursor 5 can be coated at the same time, thereby improving a processing efficiency. Each of the two coating devices 2 is driven by one driving device 4, and the positions of the two coating devices 2 are adjusted along the second direction to be fitted with the positions of the edge portions on corresponding sides of the cell precursor 5, such that the two edge portions are coated at the same time.

Two or more precursor carrying devices 1 are arranged at intervals along the first direction, and the edge coating apparatus further includes a handling device (not shown in the accompanying drawings) for transferring the cell precursor 5 on different precursor carrying platforms 11. Referring to FIGS. 1 to 4, in the present embodiment, three precursor carrying devices 1 are specifically provided; two pair of coating devices 2 are provided, each pair of coating devices 2 includes two coating devices 2, the first precursor carrying device 1 is configured to be fitted with one pair of coating devices 2 to coat one pair of edge portions of the cell precursor 5, and the second precursor carrying device 1 is configured to be fitted with the other pair of coating devices 2 to coat the other pair of edge portions of the cell precursor 5. The third precursor carrying device 1 is configured to discharge the coated cell precursor 5 for further processing.

The edge coating apparatus further includes a holder (not shown in the accompanying drawings) for placing the coated cell precursor 5, an unloading device (not shown in the accompanying drawings) for transferring the cell precursor 5 from the precursor carrying platform 11 to the holder, and a curing system (not shown in the accompanying drawings) for curing the cell precursor 5, and the curing system is a hot air dryer or a photo-curing machine or a tunnel kiln. The coated cell precursor 5 is conveyed to the holder by the unloading device, and when the coated cell precursor 5 is placed on the holder, all the coated edge portions thereof are suspended. The cell precursor 5 is conveyed to the curing system together with the holder for drying and curing.

Figure 13:
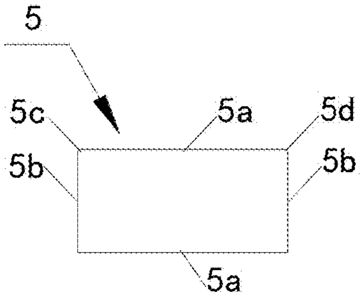
FIG. 13 is a schematic structural diagram of a to-be-coated cell precursor.
Figure 14:
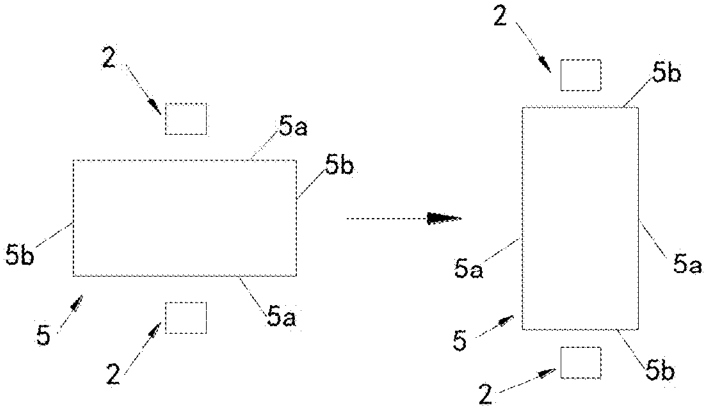
FIG. 14 is a schematic diagram of a processing flow of coating all edge portions of the cell precursor by the edge coating apparatus shown in FIG. 1.

A method and process of coating the cell precursor 5 by the above edge coating apparatus are illustrated below in conjunction with specific embodiments:

referring to FIG. 13, the to-be-coated cell precursor 5 in the present embodiment is shown, the whole cell precursor is square and has four edge portions, the four edge portions include two first edge portions 5*a* and two second edge portions 5*b*, the two first edge portions 5*a* are provided opposite and parallel to each other, the two second edge portions 5*b* are provided opposite and parallel to each other, a first chamfered portion 5*c* and a second chamfered portion 5*d* are further formed at two ends of the first edge portion 5*a* in a length direction respectively, and a whole circumferential edge of the cell precursor 5 is required to be coated.

Referring to FIGS. 7 to 12 and 14, the to-be-coated cell precursor 5 is transferred by an external handling device, horizontally placed on the precursor carrying platform 11 of the first precursor carrying device 1, and fixedly sucked on the precursor carrying platform 11, and the two to-be-coated first edge portions 5*a* on the cell precursor 5 are located on the outer side of the precursor carrying platform 11.

The cell precursor positioning system obtains the actual position of the cell precursor 5 on the precursor carrying platform 11, compares the actual position with a preset value, and transmits a corresponding required adjustment position information to the platform adjusting mechanism and the driving devices 4 on the two sides, and the platform adjusting mechanism drives the precursor carrying platform 11 to rotate, such that the extending direction of the first edge portion 5*a* is parallel to the first direction; the driving devices 4 on the two sides drive the coating devices 2 on the corresponding sides to move in the second direction, such that the discharging portions of the coating wheels 21 on the two sides correspond to the two first edge portions 5*a*, that is, such that the first edge portions 5*a* can be located in the annular groove 213 of the coating wheel 21 in the second direction and the vertical direction when the first edge portions 5*a* pass through the coating wheel 21.

The whole precursor carrying device 1 is driven by the advancing device 3 to advance in a translational manner along the first direction, and the coating devices 2 on the two sides are kept stationary in the second direction, such that in the process that the precursor carrying platform 11 translates along the first direction, the distance between the discharging portion of the coating wheel 21 and the first edge portion 5*a* is kept at a constant preset value or within a preset range. In the process that the precursor carrying device 1 translates along the first direction, the two coating wheels 21 are driven to rotate around the axes thereof, and when the first edge portion 5*a* passes through the annular groove 213, the coating material flowing out of the discharging channel 213 into the annular groove 213 is applied on the first edge portions 5*a*, and the two first edge portions 5*a* are coated at the same time. During the coating, a velocity of the horizontal movement of the precursor carrying platform 11 in the first direction is consistent with or as close as possible to a linear velocity at which the coating wheel 21 rotates for discharging, specifically, a linear velocity at the discharging opening of the discharging channel 214 of the coating wheel 21, such that the coating material can be applied to the first edge portion 5*a* as uniformly as possible. Preferably, a ratio of the velocity of the horizontal movement of the precursor carrying platform 11 in the first direction to the linear velocity of the coating wheel 21 is 0.5-1.2, such that coating materials with different viscosities can be adjusted within a certain ratio range to achieve a same coating effect.

In the above process, when the precursor carrying device 1 drives the cell precursor 5 to move forwards, the first chamfered portion 5*c* is firstly fitted with the annular groove 213, and at this point, the precursor carrying platform 11 is driven to rotate by a small angle, such that the first chamfered portion 5*c* is coated; then, the precursor carrying device 1 linearly translates along the first direction to coat the two first edge portions 5*a*; finally, the second chamfered portion 5*d* is fitted with the annular groove 213, and at this point, the precursor carrying platform 11 is driven to rotate by a small angle again, such that the second chamfered portion 5*d* is coated.

Then, the precursor carrying device 1 is conveyed forwards to be released from the fitting with the first pair of coating devices 2, and is transferred by the external handling device, horizontally placed on the precursor carrying platform 11 of the second precursor carrying device 1, and fixedly sucked on the precursor carrying platform 11, the precursor carrying platform 11 is rotated by 90°, and the two second edge portions 5*b* are suspended outside the precursor carrying platform 11. Next, the second pair of coating devices 2 cooperates with the precursor carrying device 1 to coat the two second edge portions 5*b*, similar to the coating of the first edge portion 5*a*.

Finally, after coating the four edge portions, the coated cell precursor 5 is transferred by an external handling device and horizontally placed on the precursor carrying platform 11 of the third precursor carrying device 1, so as to be conveyed to a discharging position, and then, the coated cell precursor 5 is transferred to an external carrier and conveyed to the curing system along with the external carrier to be cured, and the coating operation is completed.

In the coating apparatus according to the present embodiment, each moving component moves according to a set movement path, which is convenient to be operated to control, there is no need to use a complicated multiaxis robot, the circumferential edge portion of the cell precursor 5 is rapidly coated, and the apparatus occupies a small space, is particularly suitable for mass continuous circulation processing, and can greatly improve a coating efficiency and edge coating precision of the cell precursor 5.

In some other embodiments, only one pair of coating devices 2 may be provided, and after the coating of the two first edge portions 5*a* is completed, the precursor carrying platform 11 drives the cell precursor 5 to rotate, such that positions of the two second edge portions 5*b* correspond to the positions of the pair of coating devices 2, and then, the precursor carrying platform 11 is driven to translate along the first direction to cooperate with the coating devices 2 on the two sides, so as to coat the two second edge portions 5*b*. In some other embodiments, after the coating of the first edge portions 5*a* on the two sides is completed, the two coating devices 2 are moved apart separately, such that the positions of the two second edge portions 5*b* correspond to the positions of the pair of coating devices 2, and then, the coating devices 2 on the two sides are driven to move along the second direction to cooperate with the precursor carrying platform 11, so as to coat the two second edge portions 5*b*.

In some other embodiments, the coating device 2 and the precursor carrying platform 11 may be relatively move along the length extending direction of the edge portions in the following manner, such that the coating device 2 sequentially coats the edge portions with the coating material along the length extending direction of the edge portions: (1) the precursor carrying platform 11 on which the cell precursor 5 is sucked is kept still, and the whole coating device 2 is driven to move along the length extending direction of the to-be-coated edge portion on the cell precursor 5, such that the coating wheel 21 move relative to the cell precursor 5 while rotating for discharging, so as to coat the cell precursor 5; (2) the precursor carrying platform 11 and the coating device 2 are driven to move to generate relative movement. In both cases, the coating device 2 in the edge coating apparatus is required to be configured to be capable of moving in the first direction.

Figure 15:
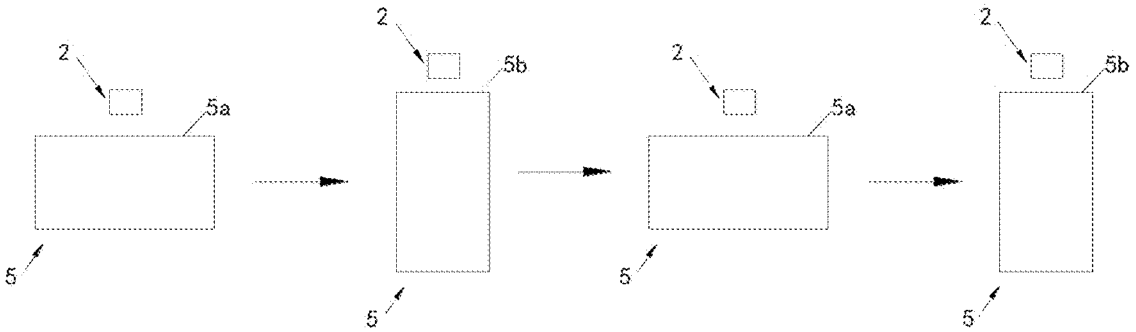
FIG. 15 is a schematic diagram of a processing flow when one precursor carrying device cooperating with one coating device coat all the edge portions of the cell precursor.

In some other embodiments, only one precursor carrying device 1 and one coating device 2 may be provided, and only the edge portion on one side is coated at a time in the process that the precursor carrying device 1 and the coating device 2 are relatively moved in the first direction. As shown in FIG. 15, after the coating of one edge portion is completed, the precursor carrying platform 11 is rotated by a suitable angle, such that the other to-be-coated edge portion extends parallel to the first direction, and the precursor carrying device 1 and the coating device 2 are driven to relatively move in the first direction to coat the other to-be-coated edge portion. By circulating in this way, all the edge portions are coated, and a production efficiency is correspondingly reduced compared with the mode of the embodiment of the present application. During specific implementation, the four edge portions of the cell precursor 5 may be sequentially coated as follows: the coating device 2 is first fitted with one first edge portion 5*a* to coat the first edge portion 5*a*, and then, the precursor carrying platform 11 drives the cell precursor 5 to rotate by 90°, such that the coating device is fitted with one second edge portion 5*b* to coat the second edge portion 5*b*; then, the other first edge portion 5*a* and the other second edge portion 5*b* are coated in sequence. Certainly, the coating order may be different from the above-described exemplary order, and for example, the coating order may be adjusted to be one first edge portion 5*a*, the other first edge portion 5*a*, one second edge portion 5*b*, and the other second edge portion 5*b*. Furthermore, in some other embodiments, a plurality of precursor carrying platforms 11 and a plurality of coating devices 2 may be provided; that is, the precursor carrying platform 11 sucks the cell precursor 5 to coat the first edge portion near the first coating device 2, the cell precursor 5 is moved to the vicinity of the second coating device 2 to complete coating of the second edge portion, and in this way, the coating of the plurality of edge portions of the cell precursor 5 is completed in sequence; the precursor carrying platforms 11 are sequentially moved to the vicinities of the corresponding coating devices 2 to complete a continuous coating operation, and productivity is increased by coating in multiple steps and increasing the number of the coating devices 2.

Figure 16:
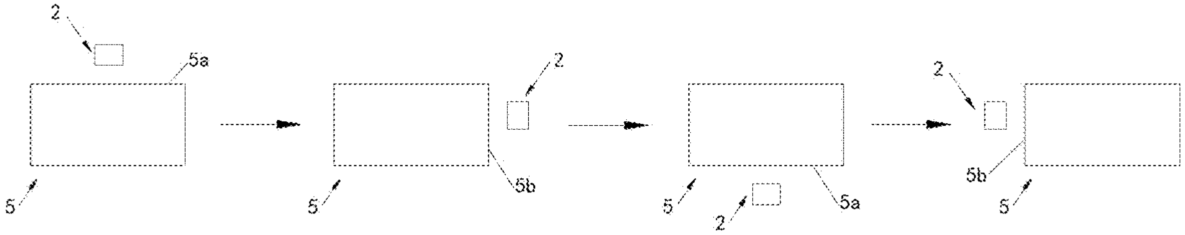
FIG. 16 is a schematic diagram of another processing flow when one precursor carrying device cooperating with one coating device coat all the edge portions of the cell precursor.

In some other embodiments, only one precursor carrying device 1 and one coating device 2 may be provided, the coating device 2 can move in the first direction and the second direction, the precursor carrying platform 11 is kept stationary during the coating process, and the coating device 2 moves in the first direction and the second direction to coat the four edge portions of the cell precursor 5 in sequence. Specifically, as shown in FIG. 16, the coating device 2 is first moved in the first direction to coat one first edge portion 5*a*, then moved in the second direction to coat one second edge portion 5*b*, then moved in the first direction to coat the other first edge portion 5*a*, and finally moved in the second direction to coat the other second edge portion 5*b*.

The above-mentioned embodiments are only for illustrating the technical idea and features of the present disclosure, and are intended to enable those skilled in the art to understand the content of the present disclosure and implement the present disclosure, and not to limit the protection scope of the present.

What is claimed is:

1. An edge coating apparatus for a photovoltaic cell precursor, comprising a coating device, the coating device comprising:
- a coating wheel capable of rotation; and
- a feeding mechanism for supplying a coating material to the coating wheel;
- wherein the coating wheel has an accommodating cavity for accommodating the coating material and a plurality of discharging channels communicating the accommodating cavity and an outer circumference surface of the coating wheel, and the plurality of discharging channels are circumferentially spaced apart.

2. The edge coating apparatus for a photovoltaic cell precursor according to claim 1, wherein an annular groove is provided in the outer circumference surface of the coating wheel which is communicated with the plurality of discharging channels.

3. The edge coating apparatus for a photovoltaic cell precursor according to claim 1, wherein the coating wheel comprises an upper wheel body and a lower wheel body which are detachably connected, a plurality of upper slots circumferentially distributed at intervals are provided in an outer circumference surface of the upper wheel body, a plurality of lower slots circumferentially distributed at intervals are provided in an outer circumference surface of the lower wheel body, and the plurality of upper slots and the plurality of lower slots are fitted in a one-to-one correspondence manner to form the plurality of discharging channels.

4. The edge coating apparatus for a photovoltaic cell precursor according to claim 1, wherein the feeding mechanism includes a feeding pipe with a lower portion which is inserted into a material injection hole on an upper portion of the coating wheel, and the feeding pipe is configured to keep stationary and continuously supplies the coating material into the accommodating cavity when the coating wheel rotates.

5. The edge coating apparatus for a photovoltaic cell precursor according to claim 1, further comprising a precursor carrying device horizontally movable along a first direction, wherein the precursor carrying device comprises a precursor carrying platform for carrying the photovoltaic cell precursor, the precursor carrying platform is a negative pressure sucking platform capable of sucking and fixing the photovoltaic cell precursor, the photovoltaic cell precursor has a to-be-coated edge portion, and when the photovoltaic cell precursor is placed on the precursor carrying platform, the edge portion is positioned on an outer side of the precursor carrying platform.

6. The edge coating apparatus for a photovoltaic cell precursor according to claim 5, wherein the precursor carrying platform is configured to be rotatable.

7. The edge coating apparatus for a photovoltaic cell precursor according to claim 6, wherein the precursor carrying device further comprises a platform adjusting mechanism for driving the precursor carrying platform to rotate to adjust a position of the precursor carrying platform, the edge coating apparatus further comprises a cell precursor positioning system for positioning an actual position of the photovoltaic cell precursor on the precursor carrying platform, and the cell precursor positioning system is in communication connection with the platform adjusting mechanism and platform adjusting mechanism.

8. The edge coating apparatus for a photovoltaic cell precursor according to claim 1, wherein two coating devices are provided, and the two coating devices are arranged on two different sides of a precursor carrying platform in a first direction.

9. The edge coating apparatus for a photovoltaic cell precursor according to claim 8, wherein two or more precursor carrying devices are arranged at intervals along the first direction, and the edge coating apparatus further comprises a handling device for transferring the photovoltaic cell precursor between different precursor carrying platforms.

10. The edge coating apparatus for a photovoltaic cell precursor according to claim 8, wherein the edge coating apparatus further comprises a holder for placing a coated cell precursor, an unloading device for transferring the coated cell precursor from the precursor carrying platform to the holder, and a curing system for curing the coated cell precursor, and the curing system is a hot air dryer or a photo-curing machine or a tunnel kiln.

11. An edge coating method for a photovoltaic cell precursor, comprising:

driving a coating material to flow to an outer circumference surface of a coating wheel from an inner cavity thereof; and during rotation of the coating wheel, the coating material on the outer circumference surface of the coating wheel contacting a to-be-coated edge portion of a cell precursor, to realize edge coating of the cell precursor.

12. The edge coating method for a photovoltaic cell precursor according to claim 11, wherein the coating material flows to the outer circumference surface of the coating wheel from the inner cavity thereof under a centrifugal force of the rotation of the coating wheel.

13. The edge coating method for a photovoltaic cell precursor according to claim 12, wherein the coating material flows to the outer circumference surface of the coating wheel from the inner cavity thereof along a diameter direction of the coating wheel.

14. The edge coating method for a photovoltaic cell precursor according to claim 13, wherein the inner cavity includes an accommodating cavity arranged within the coating wheel, the coating wheel comprises a plurality of discharging channels extending along the diameter direction of the coating wheel and communicating the accommodating cavity and the outer circumference surface of the coating wheel;

the coating material flows from the accommodating cavity to the outer circumference surface of the coating wheel along the diameter direction of the coating wheel.

15. The edge coating method for a photovoltaic cell precursor according to claim 14, wherein the coating material is supplied into the accommodating cavity by a feeding pipe with a lower portion which is inserted into a material injection hole on an upper portion of the coating wheel, and the feeding pipe is configured to keep stationary when the coating wheel rotates.

16. The edge coating method for a photovoltaic cell precursor according to claim 11, wherein the coating wheel rotates around a rotation center line extending in vertical direction for discharging, so as to coat the edge portion with the coating material.

* * * * *